United States Patent
Joncheray et al.

(10) Patent No.: US 10,844,187 B2
(45) Date of Patent: Nov. 24, 2020

(54) FUNCTIONALIZED ISOCYANATE BASED POROUS MATERIALS

(71) Applicant: Huntsman International LLC, The Woodlands, TX (US)

(72) Inventors: Thomas Julien Joncheray, Wavre (BE); Jan Vanden-Broeck, Scherpenheuvel-Zichem (BE); Gilles Jean Geumez, Waterloo (BE)

(73) Assignee: HUNTSMAN INTERNATIONAL LLC, The Woodlands, TX (US)

(*) Notice: Subject to any disclaimer, the term of this patent is extended or adjusted under 35 U.S.C. 154(b) by 313 days.

(21) Appl. No.: 15/567,386

(22) PCT Filed: Apr. 20, 2016

(86) PCT No.: PCT/EP2016/058759
§ 371 (c)(1),
(2) Date: Oct. 18, 2017

(87) PCT Pub. No.: WO2016/173903
PCT Pub. Date: Nov. 3, 2016

(65) Prior Publication Data
US 2018/0118911 A1    May 3, 2018

(30) Foreign Application Priority Data

Apr. 27, 2015 (EP) .................... 15165161

(51) Int. Cl.
*C08G 18/61* (2006.01)
*C08J 9/28* (2006.01)
(Continued)

(52) U.S. Cl.
CPC .............. *C08J 9/28* (2013.01); *C08G 18/022* (2013.01); *C08G 18/18* (2013.01); *C08G 18/289* (2013.01);
(Continued)

(58) Field of Classification Search
CPC ........ C08G 18/02; C08G 18/22; C08G 18/61; C08G 18/6225–6233
See application file for complete search history.

(56) References Cited

U.S. PATENT DOCUMENTS 5,478,867 A    12/1995  Tabor
5,484,818 A *  1/1996  De Vos ............... C08G 18/022
                                                      521/123
(Continued)

FOREIGN PATENT DOCUMENTS

WO    9502009 A1    1/1995
WO    9503358 A1    2/1995
(Continued)

OTHER PUBLICATIONS

"4,4'-Diaminodiphenylsulfone" by Chemical Book (https://www.chemicalbook.com/Chemicalproductproperty_en_cb0152851.htm) (Year: 2017).*
(Continued)

*Primary Examiner* — Michael M Dollinger
*Assistant Examiner* — Christina H. W. Rosebach
(74) *Attorney, Agent, or Firm* — Huntsman International LLC; Robert Diaz

(57) ABSTRACT

Functionalized isocyanate based organic aerogel/xerogel/cryogel comprising:
a cross-linked porous network structure made of polyurethane and/or polyisocyanurate and/or polyurea, comprising on their pore surface before functionalization reactive groups (B) and
functionalization molecules having a solubility in water <10 g/L at 20° C. chemically attached to the pore surface of the cross-linked porous network structure wherein said molecules have at least one reactive group (A) being capable of binding to said pore surface (by (Continued)

reaction with groups (B)) and at least one functional group (C) providing the pore surface with the desired functionalization.

8 Claims, 4 Drawing Sheets

(51) Int. Cl.
*C08J 9/36* (2006.01)
*C08G 18/02* (2006.01)
*C08G 18/28* (2006.01)
*C08G 18/18* (2006.01)
*C08G 18/79* (2006.01)
*C08G 101/00* (2006.01)

(52) U.S. Cl.
CPC ........... *C08G 18/61* (2013.01); *C08G 18/791* (2013.01); *C08G 18/792* (2013.01); *C08J 9/36* (2013.01); C08G 2101/0066 (2013.01); C08G 2101/0091 (2013.01); C08G 2220/00 (2013.01); C08J 2201/0482 (2013.01); C08J 2201/0502 (2013.01); C08J 2205/024 (2013.01); C08J 2205/026 (2013.01); C08J 2205/028 (2013.01); C08J 2205/042 (2013.01); C08J 2205/044 (2013.01); C08J 2375/02 (2013.01); C08J 2375/04 (2013.01)

(56) References Cited

U.S. PATENT DOCUMENTS

| | | |
|---|---|---|
| 5,942,553 A | 8/1999 | Biesmans et al. |
| 6,063,826 A | 5/2000 | Biesmans et al. |
| 2006/0211840 A1 | 9/2006 | Lee |
| 2010/0148109 A1* | 6/2010 | Schadler ............... C08J 9/28 252/62 |
| 2012/0115969 A1 | 5/2012 | Fricke et al. |
| 2012/0220679 A1 | 8/2012 | Fricke et al. |
| 2014/0147607 A1 | 5/2014 | Leventis et al. |
| 2015/0266983 A1* | 9/2015 | Leventis ............. B01J 31/2208 521/147 |
| 2019/0276630 A1* | 9/2019 | Bassaganas Turon ..... C08J 9/28 |

FOREIGN PATENT DOCUMENTS

| | | |
|---|---|---|
| WO | 9805591 A1 | 2/1998 |
| WO | 2008138977 A1 | 11/2008 |
| WO | 2012000917 A1 | 1/2012 |

OTHER PUBLICATIONS

Translation of WO 2008138977 by Fricke et al. (Year: 2008).*
Mahadik et al., 'Functionally graded polyurea aerogels : synthesis and characterization', Polymer Preprints 2011, 52 (1), 265.

* cited by examiner

FUNCTIONALIZED ISOCYANATE BASED POROUS MATERIALS

CROSS-REFERENCE TO RELATED APPLICATIONS

This application is the National Phase of International Application PCT/EP2016/058759 filed Apr. 20, 2016 which designated the U.S. and which claims priority to European App. Serial No. 15165161.9 filed Apr. 27, 2015. The noted applications are incorporated herein by reference.

FIELD OF INVENTION

The present invention is related to the synthesis of isocyanate based organic porous materials, more in particular isocyanate based organic aerogels/xerogels/cryogels which pore surface is functionalized resulting in isocyanate based organic aerogels/xerogels/cryogels having specific properties such as hydrophobicity.

The invention further relates to hydrophobic isocyanate based organic aerogels/xerogels/cryogels, preferably methylene diphenyl diisocyanate (MDI) based aerogels/xerogels/cryogels comprising hydrophobic groups attached to the pore surface.

The functionalized aerogels/xerogels/cryogels according to the invention are suitable for use in a lot of applications such as the use as or in insulation products (thermal and/or acoustic).

BACKGROUND

Aerogels (made using supercritical $CO_2$ drying), xerogels (made using ambient pressure drying) and cryogels (made using freeze drying) are porous materials (open pore structure) with pore size typically in the micrometer or even nanometer range. Specific surface areas can be very large (>1 $m^2/g$, as high as 1000 $m^2/g$ in some instances), and therefore the chemical/physical properties of their pore surface have a tremendous impact on the final aerogel/xerogel/cryogel properties.

Aerogels/xerogels/cryogels are typically synthesized by first allowing monomers to react in a solvent to form a gel (gelling/gelation step, cross-linked porous network with pores filled with solvent) and then by removal of the solvent. An aerogel is obtained if the solvent is removed from the pores under supercritical conditions (e.g. supercritical $CO_2$). A xerogel is obtained if the solvent is removed (evaporated) from the pores under ambient conditions. A cryogel is obtained if the solvent is removed from the pores by freeze drying. Additional steps in the synthesis such as ageing (a known process in which the gel is left standing for a certain period of time to allow further monomer conversion and/or reinforcement of the polymeric network) after gel formation or various solvent exchanges (to wash away unreacted species and/or to minimize shrinkage during solvent evaporation) can be optionally included to improve final aerogel/xerogel/cryogel properties.

To further explore the chemical/physical properties of aerogel/xerogel/cryogel materials and to develop new applications, functionalization of the pore surface is often required. Functionalization of a material refers to the process of changing its surface chemistry. Silica-based (inorganic) aerogels/xerogels/cryogels have been studied for several decades, and a number of approaches have been successfully implemented to functionalize their pore surface. It can for instance be achieved during the gelation step of the fabrication of silica-based (inorganic) aerogels/xerogels/cryogels by adding specific monomers included in the solvent based gelling process. Alternatively, it can be achieved after the gelation step of the fabrication of silica-based (inorganic) aerogels/xerogels/cryogels by adding, before removal of the solvent, molecules which react with functional groups still present after gelation. This technique has been particularly successful for instance to eliminate surface SiOH groups in silica aerogels/xerogels/cryogels by reacting these groups with chlorotrimethylsilane (a technique called "passivation"). This functionalization proved crucial to minimize shrinkage of silica xerogels during ambient pressure drying [WO9805591A1]. Yet another alternative to functionalize silica-based (inorganic) aerogels/xerogels/cryogels is to add molecules which react with functional groups still present in the aerogels/xerogels/cryogels after complete fabrication of the aerogels/xerogels/cryogels in the dry state (after solvent removal) by using chemical vapours containing the molecules which react with functional groups still present in the aerogel s/xerogel s/cryogels.

Isocyanate based organic aerogels/xerogels/cryogels (comprising polyurethane and/or polyurea and/or polyisocyanurate) have been investigated since the early 90's [U.S. Pat. Nos. 5,484,818A, 6,063,826A, 5,942,553A, WO2012000917A1, US2010148109A1, US20120220679A1, US2012115969A1, WO9502009A1, US20060211840, US2014147607A1]. There is however lack of methods to achieve pore surface functionalization which is crucial to expand dramatically the range of applications of these isocyanate based organic aerogels/xerogels/cryogels. The above described functionalization techniques successfully applied to silica based aerogels/xerogels/cryogels can however not be directly applied/transferred to isocyanate based aerogels/xerogels/cryogels because of significantly different chemistries.

There is hence a need to develop a synthesis method to functionalize these isocyanate based porous materials to easily tune their properties, which would open up a variety of new applications.

GOAL OF THE INVENTION

It is the goal of the invention to develop a synthesis method to provide isocyanate based organic aerogels/xerogels/cryogels which pore surface has been functionalized (attachment of functional groups of interest to the pore surface) such that said aerogels/xerogels/cryogels can exhibit tuneable properties and a hydrophobic behaviour may be achieved.

Therefore, the present invention relates to novel functionalized isocyanate based organic aerogels/xerogels/cryogels, synthesis methods to provide said novel functionalized isocyanate based organic aerogels/xerogels/cryogels and use of the novel functionalized isocyanate based organic aerogels/xerogels/cryogels for superior thermal insulation, acoustic insulation, fire properties, waterproof properties, . . . and many more.

SUMMARY OF THE INVENTION

According to the invention, functionalized isocyanate based organic aerogel/xerogel/cryogel are disclosed comprising:
  a cross-linked porous network structure made of polyurethane and/or polyisocyanurate and/or polyurea, comprising on their pore surface before functionalization reactive groups (B) capable of binding (covalent bond formation) to reactive groups (A) present in the functionalization molecules and functionalization molecules having a solubility in water <10 g/L at 20° C. chemically attached (covalent bond) to the pore surface of the cross-linked porous network structure wherein said molecules have at least one reactive group (A) being capable of binding to said pore surface (covalent bond formed by reaction with reactive groups (B) present on pore surface) and at least one functional group (C) providing the pore surface with the desired functionalization.

According to embodiments, the functionalization molecules have a solubility in water <1 g/L, preferably <0.1 g/L at 20° C.

According to embodiments, the functionalization molecules are selected from siloxanes, compounds having aliphatic carbon chains having at least 8 carbon atoms, fluorinated and/or perfluorinated compounds, Polyethylene, Polypropylene, Polybutadiene, and/or Polyisoprene.

According to embodiments, the functionalization molecules are selected from polyalkylsiloxanes, preferably selected from PolyDiMethylSiloxanes (PDMS).

According to embodiments, the functionalization molecules have aliphatic carbon chains having at least 8 carbon atoms preferably selected from saturated and/or unsaturated fatty acid and/or alcohol derivatives.

According to embodiments, the functionalized aerogel/xerogel/cryogel of the invention is comprising:
  50-99.9%, preferably 60-99%, more preferably 70-99% by weight polyurethane and/or polyisocyanurate and/or polyurea calculated on the total dry weight of the functionalized aerogel/xerogel/cryogel, and
  at least 0.1% by weight functionalization molecules calculated on the total dry weight of the functionalized aerogel/xerogel/cryogel and wherein said molecules are attached to the pore surface of the aerogel/xerogel/cryogel.

According to embodiments, the functionalized aerogel/xerogel/cryogel of the invention has a porous network structure made of polyurethane and/or polyisocyanurate and/or polyurea which comprises on its pore surface before functionalization reactive groups (B) being capable of binding with the reactive groups (A) being present in the functionalization molecules by means of a urethane, isocyanurate and/or urea bonding and wherein said bonding is taking place on the pore surfaces of the isocyanate based organic aerogel/xerogel/cryogel cross-linked porous network structure.

According to embodiments, the functionalized aerogel/xerogel/cryogel of the invention has a porous network structure made of polyurethane and/or polyisocyanurate and/or polyurea which comprises on its pore surface before functionalization reactive groups (B) being capable of binding with the reactive groups (A) being present in the functionalization molecules by means of an ether, ester, oxazolidone, olefin, siloxane and/or amide bonding and wherein the bonding is taking place on the pore surfaces of the isocyanate based organic aerogel/xerogel/cryogel cross-linked porous network structure.

According to embodiments, the functionalized aerogel/xerogel/cryogel of the invention has a cross-linked porous network structure having following properties:
  Overall porosity: 20 to 99%, preferably 50 to 99%, more preferably 70 to 99%
  Overall density: lower than 800 kg/m$^3$, preferably in the range 30 to 500 kg/m$^3$, more preferably <300 kg/m$^3$
  Average pore diameter: 0.1 nm to 1 mm, especially <200 μm, preferably <1 μm, especially 1 to 200 nm, more preferably 5 to 100 nm According to embodiments, the functionalized aerogel/xerogel/cryogel of the invention has a lambda value under atmospheric pressure in the range 9-50 mW/m·K at 10° C. together with a low density in the range 50-300 kg/m$^3$.

According to embodiments, the functionalized aerogel/xerogel/cryogel of the invention may further have functional groups in the functionalization molecules selected from functional groups having resistance or low reaction to fire, selective adsorption and/or pH responsive properties.

Also according to the invention, a process is disclosed for making the functionalized isocyanate based organic aerogel/xerogel/cryogel of the invention, said process comprising the following steps:
  a) Providing a polyisocyanate composition, and
  b) Optionally providing an isocyanate reactive composition, and
  c) Optionally providing at least one catalyst compound promoting a polyurethane and/or polyurea and/or polyisocyanurate formation (trimerization), and
  d) Providing a solvent, and
  e) Optionally providing further additives, and then
  f) Combining the compositions/compounds a), d) and optionally b) and/or c) and/or e) to form a gel comprising a porous cross-linked polyurethane and/or polyurea and/or polyisocyanurate network having residual reactive groups (B), this step referred to as "gelling" step, and then
  g) Optionally removing unreacted species, and then
  h) Adding at least one functionalization molecule having a solubility in water <10 g/L at 20° C. (optionally dissolved in a solvent and optionally in the presence of a catalyst), having at least one reactive group (A) being capable of binding to the pore surface (by reaction with reactive groups (B)) and at least one functional group (C) providing the porous network with the desired functionalization and forming a functionalized porous network, and then
  i) Optionally removing unreacted species, and then
  j) Optionally exchanging solvent, and then
  k) Drying (solvent removal) the functionalized porous network in order to obtain the functionalized isocyanate based organic aerogel/xerogel/cryogel.

According to embodiments, the process for making the functionalized isocyanate based organic aerogel/xerogel/cryogel of the invention further comprises after the gelling step, a step wherein the obtained gel is a monolithic gel which is optionally broken or grinded into particles having smaller dimensions.

According to embodiments, the process for making the functionalized isocyanate based organic aerogel/xerogel/cryogel of the invention further comprises after the gelling step, a step wherein the obtained gel or particles are aged.

According to embodiments, the polyisocyanate composition used in the process for making the functionalized isocyanate based organic aerogel/xerogel/cryogel of the invention is selected from organic isocyanates containing a plurality of isocyanate groups including aliphatic isocyanates such as hexamethylene diisocyanate and more preferably aromatic isocyanates such as m- and p-phenylene diisocyanate, tolylene-2,4- and 2,6-diisocyanates, diphenylmethane-4,4'-diisocyanate.

According to embodiments, the isocyanate reactive composition used in the process for making the functionalized isocyanate based organic aerogel/xerogel/cryogel of the invention is selected from the group of aliphatic and aromatic monoamine/polyamine compounds, aromatic and aliphatic polyether and/or polyester monool/polyol compounds and mixtures thereof, preferably polyethers, more preferably polyalkylene polyethers having an average nominal hydroxy functionality of 1-8 and an average molecular weight of 32-8000 g/mol.

According to embodiments, the step of combining the compositions/compounds a), d) and optionally b) and/or c) and/or e) in the process for making the functionalized isocyanate based organic aerogel/xerogel/cryogel of the invention is performed by mixing or simply shaking the reaction vessel or by slowly stirring the mixture at temperatures in the range of from about 10° C. to about 50° C., preferably 15 to 25° C., and then the mixture is left standing for a certain period of time to form a gel.

According to embodiments, the catalyst used in the process for making the functionalized isocyanate based organic aerogel/xerogel/cryogel of the invention is a trimerization catalyst selected from quaternary ammonium hydroxides and salts, alkali metal and alkaline earth metal hydroxides, alkoxides and carboxylates, for example potassium acetate and potassium 2-ethylhexoate, certain tertiary amines and non-basic metal carboxylates, for example lead octoate, and symmetrical triazine derivatives and the ratio isocyanates/isocyanate reactives (NCO Index) is >>100, preferably >200, more preferably >300 and the obtained isocyanate based organic aerogel/xerogel/cryogel is a functionalized polyisocyanurate (PIR) comprising xerogel/aerogel/cryogel.

According to embodiments, the catalyst used in the process for making the functionalized isocyanate based organic aerogel/xerogel/cryogel of the invention is a polyurethane catalyst selected from aliphatic and aromatic tertiary amines such as N,N-dimethylcyclohexylamine, organometallic compounds, especially tin compounds such as stannous octoate and dibutyltin dilaurate, alkali metal salts and the ratio isocyanates/isocyanate reactives (NCO Index) is at least 100, preferably in the range 100-200, more preferably 110-150 and the obtained isocyanate based organic aerogel/xerogel/cryogel is a functionalized polyurethane (PUR) and/or polyurea comprising xerogel/aerogel/cryogel.

According to embodiments, the catalyst used in the process for making the functionalized isocyanate based organic aerogel/xerogel/cryogel of the invention is a polyurethane catalyst selected from aliphatic and aromatic tertiary amines such as N,N-dimethylcyclohexyl amine, organometallic compounds, especially tin compounds such as stannous octoate and dibutyltin dilaurate, alkali metal salts and the ratio isocyanates/isocyanate reactives (NCO Index) is below 100, preferably in the range 50-95 and the obtained isocyanate based organic aerogel/xerogel/cryogel is a functionalized polyurethane (PUR) and/or polyurea comprising xerogel/aerogel/cryogel.

According to embodiments, the obtained isocyanate based organic aerogel/xerogel/cryogel in the process for making the functionalized isocyanate based organic aerogel/xerogel/cryogel of the invention has a functionalized polyisocyanurate (PIR) and/or polyurethane (PUR) and/or polyurea network in which residual silane and/or acrylate groups (B) present on the pore surface before functionalization have been reacted with functionalization molecules having reactive groups (A) selected from silane groups, acrylate groups, . . . .

According to embodiments, the step of removing the solvent in step k) in the process for making the functionalized isocyanate based organic aerogel/xerogel/cryogel of the invention is performed by drying the gel comprising the functionalized porous network by using supercritical $CO_2$, alternatively the step of drying is performed by evaporating the organic solvents being present in the gel by air-drying (under ambient pressure and ambient temperature until constant weight), drying under vacuum, drying in an oven at elevated temperatures, microwave drying, radiofrequency drying, sublimation, freeze drying or any combination thereof.

According to embodiments, the solvents used in the process for making the functionalized isocyanate based organic aerogel/xerogel/cryogel of the invention are selected from hydrocarbons, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers and mixtures of such compounds.

Further according to the invention, the use of the functionalized xerogels/aerogels/cryogels of the invention is disclosed, wherein the functionalized xerogels/aerogels/cryogels are used as such and/or for preparing foams and/or for combining with fillers and/or to make composite materials, to achieve materials with improved thermal and/or acoustic insulating properties, improved fire retardancy, waterproof properties and/or improved mechanical strength, . . . .

Definitions and Terms

In the context of the present invention the following terms have the following meaning:

1) The term "isocyanate index" or "NCO index" or "index" as used herein means the ratio of NCO-groups over isocyanate-reactive hydrogen atoms present in a formulation, given as a percentage:

[NCO]×100/[active hydrogen](%)

In other words the NCO-index expresses the percentage of isocyanate actually used in a formulation with respect to the amount of isocyanate theoretically required for reacting with the amount of isocyanate-reactive hydrogen used in a formulation.

The NCO value as indicated in the examples is measured using a measurement method based on titration. The isocyanate is reacted with an excess of di-n-butylamine to form ureas. The unreacted amine is then titrated with standard nitric acid to the colour change of bromocresol green indicator or to a potentiometric endpoint. The percent NCO or NCO-value is defined as the percent by weight of NCO-groups present in the product.

Further, it should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.

2) The term "polyisocyanate based" or "isocyanate based" xerogel/aerogel/cryogel as used herein means that the xerogels/aerogels/cryogels of the present invention can be of the following types: polyurethane xerogels/aerogels/cryogels, polyurea xerogels/aerogels/cryogels, polyisocyanurate xerogels/aerogels/cryogels, polyisocyanurate/polyurethane xerogels/aerogels/cryogels, polyurea/polyurethane xerogels/aerogels/cryogels, polyallophanate xerogels/aerogels/cryogels, polybiuret xerogels/aerogels/cryogels.

3) The term "Composite" as used herein refers to materials made from two or more constituent materials with significantly different physical or chemical properties, that when combined, produce a material with characteristics different from the individual components. The individual components remain separate and distinct within the finished structure.

4) The terms "organic porous materials", "isocyanate based organic porous materials", "isocyanate based porous materials", and "isocyanate based organic xerogels/aerogels/cryogels" as used herein are limited in this invention towards materials having porosities in the range 20 to 99%, having densities lower than 800 kg/m$^3$, preferably in the range from 30 to 500 kg/m$^3$. The surface area of the xerogel/aerogel/cryogel of the present invention is up to 1500 m$^2$/g. Surface areas can be determined, for example, using the Brunauer, Emmett Teller (BET) method.

5) The expression "monolith" refers to a continuous piece (i.e. defect/crack-free) of a porous material (having solvent-filled pores before the solvent removal step and herein referred to as "monolithic gel" or having gas-filled pores after the solvent removal step). The dimensions of a monolith are typically determined by the size of the container in which gelation is performed. Monoliths can therefore have dimensions as large as hundreds or thousands of cubic centimeters. A grinded/cut monolith results in "particles" (solvent-filled pores before the solvent removal step or gas-filled pores after the solvent removal step). Grinding/cutting can be performed anytime after the gelation step, on a monolith with or without solvent-filled pores. Particle size is determined by the grinding/cutting process.

6) The expressions "isocyanate-reactive compounds", "NCO-reactive compounds" "isocyanate-reactive hydrogen atoms" and "isocyanate-reactive groups" as used herein refer to active hydrogen atoms in hydroxyl and amine groups present in the isocyanate reactive compounds. Compounds having one hydroxyl group are considered to comprise one reactive hydrogen, compounds having one primary amine group are considered to comprise one reactive hydrogen and one water molecule is considered to comprise two active hydrogens.

7) The word "average" as used herein refers to number average unless indicated otherwise.

8) "Lambda value" as used herein refers to the thermal conductivity of a material (also known as k value) normally expressed in mW/m·K. The lower the lambda value the more insulating the material (i.e. better thermal insulation performance).

9) "Acoustic insulation" as used herein refers to reducing sound pressure with respect to a specified sound source and receptor.

10) The expressions "hydrophobic", "hydrophobicity", or "hydrophobic character" when used for porous materials or aerogels/xerogels/cryogels refer to water repellent properties with a water contact angle>90°. In that sense, "hydrophobic", "hydrophobicity" or "hydrophobic character" means that a water droplet placed on the surface of the porous material of the invention forms a contact angle (θ) greater than 90° using the drop shape method of contact angle measurement.

11) The expression "hydrophobic molecules" refers to molecules having limited solubility in water, i.e. <10 g/L, preferably <1 g/L, more preferably <0.1 g/L at 20° C.

FIGURES

Figure 1:
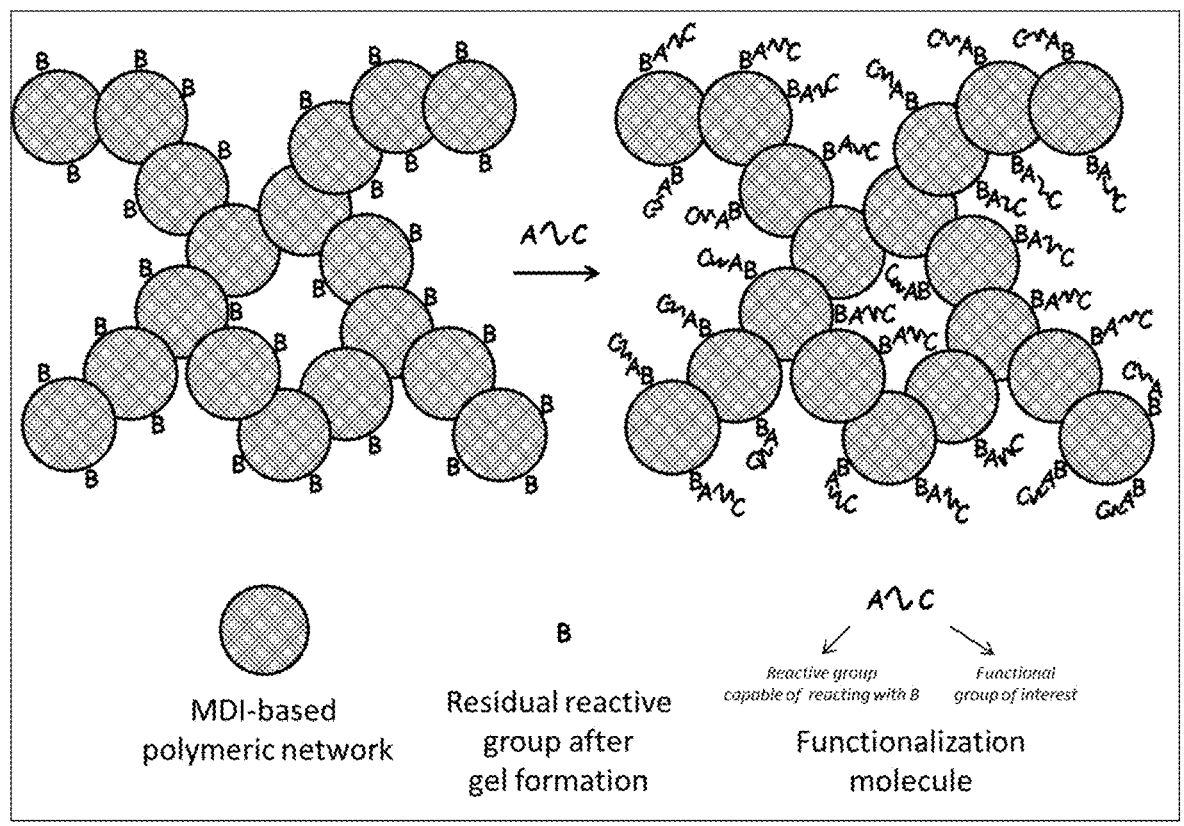
FIG. 1 is a generic representation which illustrates the functionalization of an MDI-based xerogel/aerogel/cryogel according to the invention, having residual groups B, with reactive groups A being present in the functionalization molecules (which also further comprise functional groups of interest C). The functionalization is performed after gelling, and before solvent removal.
Figure 2A:
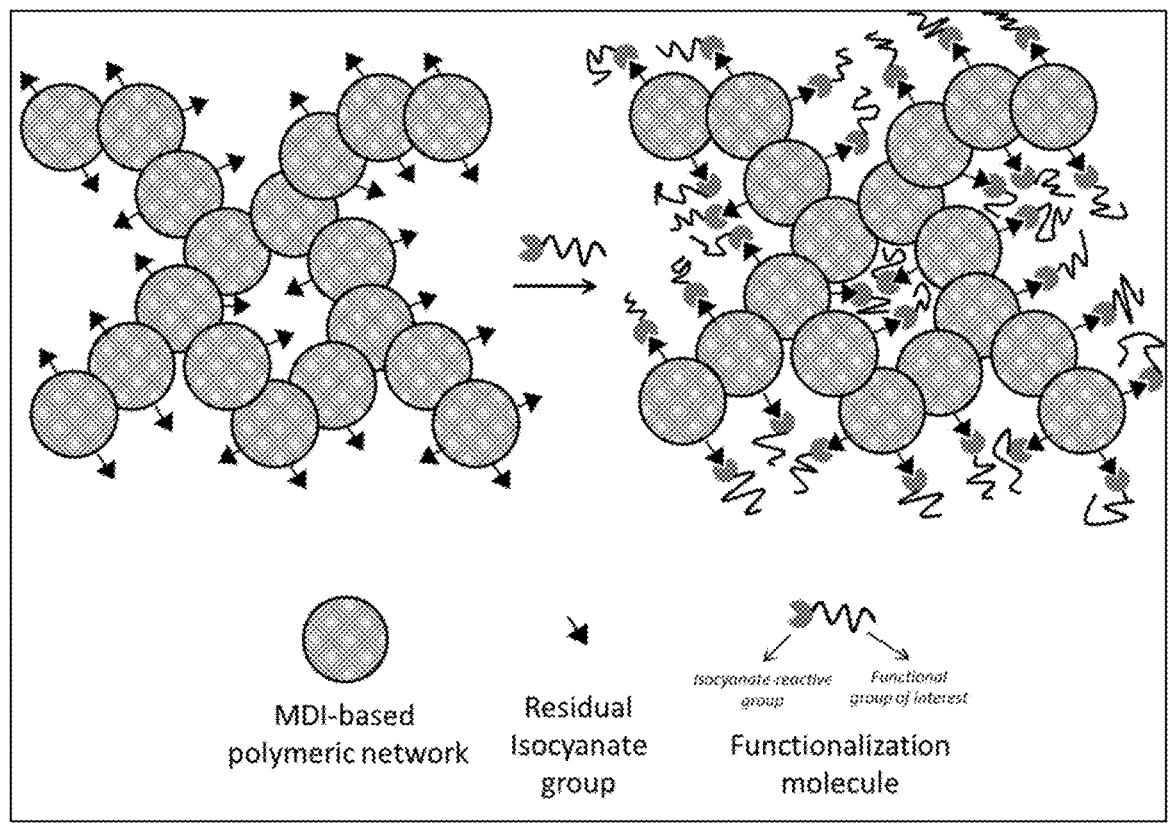
FIG. 2A illustrates the functionalization of an MDI-based xerogel/aerogel/cryogel, having residual NCO groups, with isocyanate reactive groups being present in the functionalization molecules (which also further comprise functional groups of interest) according to methods of the invention (the functionalization is performed after gelling, and before solvent removal).
Figure 2B:
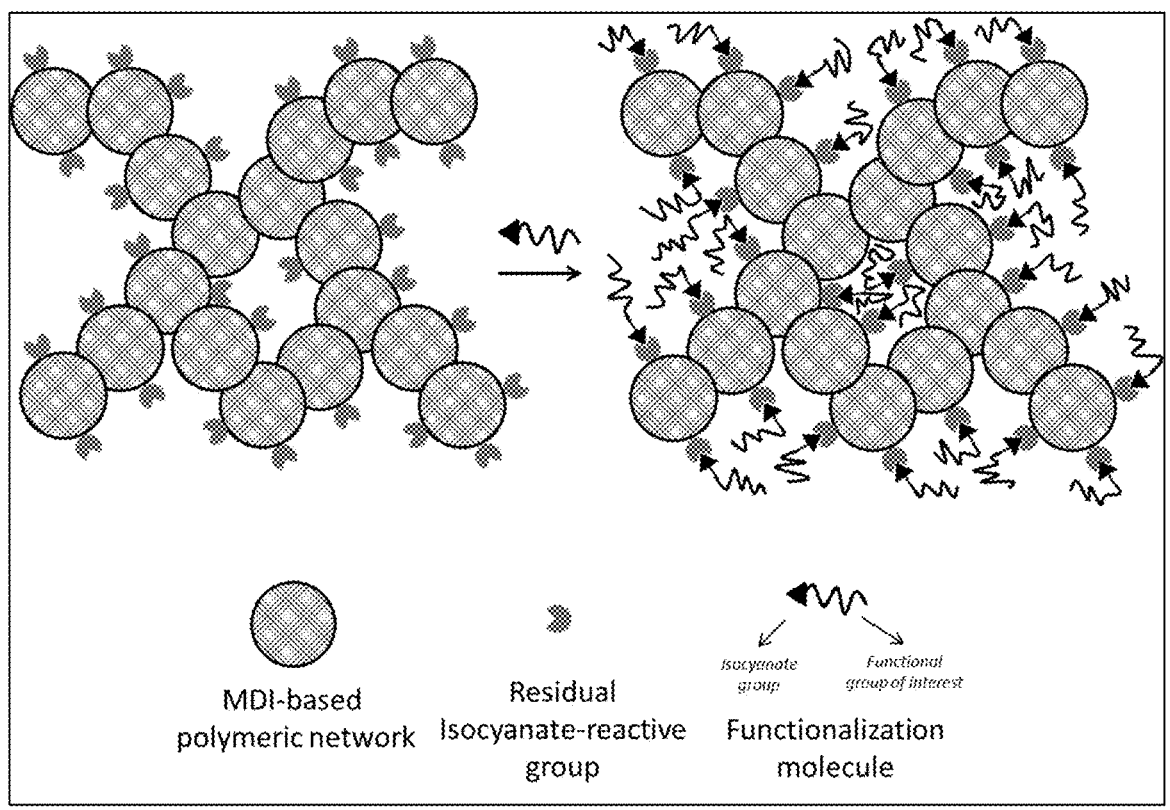

FIG. 2B illustrates the functionalization of an MDI-based xerogel/aerogel/cryogel, having residual isocyanate reactive groups (such as hydroxyl/amine groups), with isocyanate groups being present in the functionalization molecules (which also further comprise functional groups of interest) according to methods of the invention (the functionalization is performed after gelling, and before solvent removal).

Figure 3A:
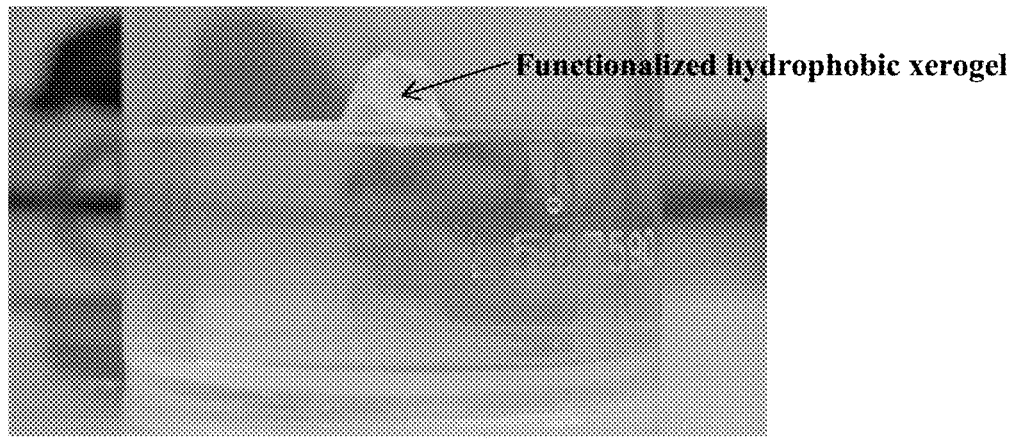
Figure 3B:
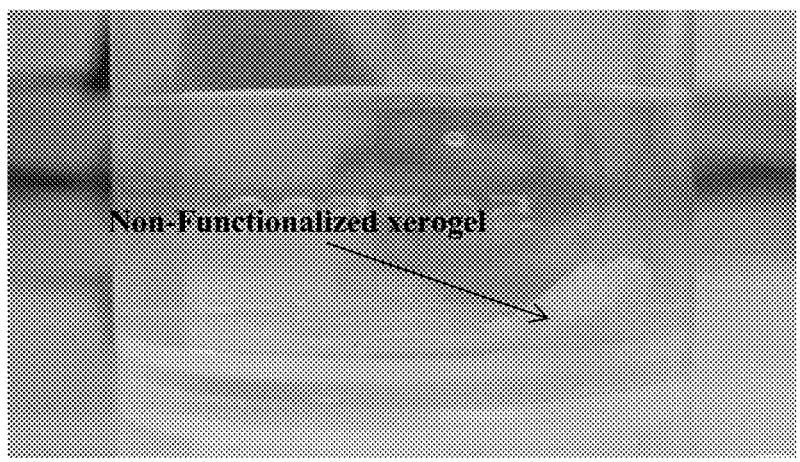

FIG. 3A illustrates the water infiltration test performed on a functionalized hydrophobic MDI-based PIR xerogel according to the invention. The functionalized hydrophobic MDI-based PIR xerogel added to a water-containing vial is clearly floating on top of the water surface, an indication that the open pores are not infiltrated by water. FIG. 3B illustrates the same water infiltration test performed on a non-functionalized MDI-based PIR xerogel (comparative). The non-functionalized MDI-based PIR xerogel is sinking into the water towards the bottom of the vial, an indication that the open pores are infiltrated by water.

DETAILED DESCRIPTION

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a compound comprising components X and Y" should not be limited to compounds consisting only of components X and Y. It means that with respect to the present invention, the only relevant components of the compound are X and Y.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

It is to be understood that although preferred embodiments and/or materials have been discussed for providing embodiments according to the present invention, various modifications or changes may be made without departing from the scope and spirit of this invention.

According to a first aspect of the invention, a functionalized isocyanate based organic aerogel/xerogel/cryogel is provided having functional groups attached to the pore surface of the isocyanate based organic aerogel/xerogel/cryogel.

The functionalized isocyanate based organic aerogels/xerogels/cryogels according to the invention, which can be made in the form of monoliths or particles, comprise an isocyanate based cross-linked porous network structure made of polyurethane and/or polyisocyanurate and/or polyurea and having specific functional groups of interest attached to the pore surface.

The functionalized isocyanate based organic aerogel/xerogel/cryogel according to the invention comprises:
  A cross-linked porous network structure made of polyurethane and/or polyisocyanurate and/or polyurea, comprising on their pore surface before functionalization reactive groups (B) capable of binding (covalent bond formation) to reactive groups (A) present in the functionalization molecules and
  functionalization molecules chemically attached (covalent bond) to the pore surface of the cross-linked porous network structure wherein said molecules have at least one reactive group (A) being capable of binding to said pore surface (covalent bond formed by reaction with reactive groups (B) present on pore surface) and at least one functional group (C) providing the pore surface with the desired functionalization According to embodiments, the aerogel/xerogel/cryogel according to the invention may be in the form of a monolith or a broken/grinded monolith (also referred to as "particle (s)").

According to embodiments, the functionalized isocyanate based organic aerogels/xerogels/cryogels according to the invention comprise monoliths or particles having a cross-linked porous network structure wherein said monoliths or particles comprise:
  50-99.9% by weight polyurethane and/or polyisocyanurate and/or polyurea calculated on the total dry weight of the functionalized aerogel/xerogel/cryogel, and
  at least 0.1% by weight functionalization molecules calculated on the total dry weight of the functionalized aerogel/xerogel/cryogel and wherein said molecules are attached to the pore surface of the cross-linked porous network.

According to embodiments, the isocyanate based organic aerogels/xerogels/cryogels according to the present invention are nanoporous materials.

According to embodiments, the functionalization molecules are molecules having at least one reactive group (A) being capable of binding to the pore surface (by reaction with reactive groups (B) present on pore surface before functionalization) of the isocyanate based organic aerogel/xerogel/cryogel porous monoliths or particles and at least one functional group (C) providing the pore surface with the desired functionalization and thus forming functionalized porous monoliths or particles.

According to embodiments, the functionalization molecules have at least one reactive group (A) being capable of binding to the pore surface (by reaction with reactive groups (B) present on pore surface before functionalization) of the isocyanate based organic aerogel/xerogel/cryogel monoliths or particles, said bonding may be a urethane, isocyanurate and/or urea bonding. Said bonding is taking place on the pore surfaces of the isocyanate based organic aerogel/xerogel/cryogel porous monoliths or particles.

According to embodiments, the functionalization molecules have at least one reactive group (A) being capable of binding to the pore surface (by reaction with reactive groups (B) present on pore surface before functionalization) of the isocyanate based organic aerogel/xerogel/cryogel porous monoliths or particles, said bonding may be an ether, ester, oxazolidone, siloxane, olefin and/or amide bonding. Said bonding is taking place on the pore surfaces of the isocyanate based organic aerogel/xerogel/cryogel porous monoliths or particles.

According to embodiments, the functionalized isocyanate based organic aerogels/xerogels/cryogels according to the present invention comprise 50-99.9% by weight, preferably 60-99% by weight, more preferably 70-99% by weight polyurethane and/or polyisocyanurate and/or polyurea calculated on the total dry weight of the functionalized isocyanate based organic aerogels/xerogels/cryogels.

According to embodiments, the functionalized isocyanate based organic aerogel/xerogel/cryogel according to the present invention comprises porous aerogel/xerogel/cryogel monoliths or particles having the following parameters:
  Overall porosity: 20 to 99%, preferably 50 to 99%, more preferably 70 to 99%
  Overall density: lower than 800 kg/m$^3$, preferably in the range 30 to 500 kg/m$^3$, more preferably <300 kg/m$^3$
  Average pore diameter: 0.1 nm to 1 mm, especially <200 μm, preferably <1 μm, especially 1 to 200 nm, more preferably 5 to 100 nm.

According to embodiments, the isocyanate based organic aerogel/xerogel/cryogel according to the present invention comprises porous monoliths or particles having a lambda value under atmospheric pressure in the range 9-50 mW/m·K at 10° C. together with a low density in the range 50-300 kg/m$^3$.

According to embodiments, the functional group (C) in the functionalization molecules used to functionalize the isocyanate based organic aerogel/xerogel/cryogel according to the present invention is selected from functional groups such as siloxanes, preferably polyalkylsiloxanes (such as PolyDiMethylSiloxanes (PDMS)), (long) aliphatic carbon chains having 8 or more carbon atoms (e.g. saturated/unsaturated fatty acid/alcohol derivatives), fluorinated/perfluorinated groups, Polyethylene, Polypropylene, Polybutadiene, and/or Polyisoprene, . . . .

According to embodiments, the functionalization molecules used to functionalize the isocyanate based organic aerogel/xerogel/cryogel according to the present invention may further have functional groups selected from functional groups having resistance or low reaction to fire. Examples of said functional groups are inorganic-based groups such as aluminum or magnesium-based functional groups (preferably oxides), aromatic groups such as polyimide, polybenzimidazole . . . , phosphorous or nitrogen-containing functional groups, halogenated groups such as brominated or chlorinated functional groups, . . . .

According to embodiments, the functionalization molecules used to functionalize the isocyanate based organic aerogel/xerogel/cryogel according to the present invention may further have functional groups selected from functional groups having selective adsorption (e.g. selective adsorption of cholesterol, sugars, metal cations, gases, . . . ). Examples of said functional groups are cyclodextrins, calixarenes, crown ethers and proteins.

According to embodiments, the functionalization molecules used to functionalize the isocyanate based organic aerogel/xerogel/cryogel according to the present invention may further have functional groups selected from functional groups having pH responsive properties. Examples of said functional groups are acids and bases (polysulfates, polyacrylic acid, Chitosan . . . ).

According to a second aspect of the invention, a process for making the functionalized isocyanate based organic aerogel/xerogel/cryogel according to the invention is disclosed, said process comprising at least the following steps:
a) Providing a polyisocyanate composition, and
b) Optionally providing an isocyanate reactive composition, and
c) Optionally providing at least one catalyst compound promoting a polyurethane and/or polyurea and/or polyisocyanurate formation (trimerization), and
d) Providing a solvent composition, and
e) Optionally providing further additives, and then
f) Combining compositions/compounds a), d) and optionally b) and/or c) and/or e) to form a gel comprising a porous cross-linked polyurethane and/or polyurea and/or polyisocyanurate network (having pores filled with solvent at this stage) and residual reactive groups (B), this step is also referred to as "gelling" step, and then
g) Optionally removing unreacted species, and then
h) Adding at least one functionalization molecule having a solubility in water <10 g/L at 20° C. (optionally dissolved in a solvent and optionally in the presence of a catalyst) having at least one reactive group (A) being capable of binding to the pore surface (by reaction with reactive groups (B)) and at least one functional group (C) providing the porous network with the desired functionalization and forming a functionalized porous network, and then
i) Optionally removing unreacted species, and then
j) Optionally exchanging solvent, and then
k) Drying (solvent removal) the functionalized porous network in order to obtain the functionalized isocyanate based organic aerogel/xerogel/cryogel (gas-filled pores, e.g. with air).

According to embodiments, after the gelling step, the obtained gel is a monolithic gel which may be further broken or grinded into particles having smaller dimensions.

According to embodiments, after the gelling step, the obtained gel is aged.

According to embodiments, the step of optionally removing unreacted species in the obtained gel (monolith or particles) is performed by washing the gel with fresh solvent. Said solvent may be the same or different from the solvent used to form the monolithic gel.

According to embodiments, the polyisocyanate composition is preferably selected from organic isocyanates containing a plurality of isocyanate groups including aliphatic isocyanates such as hexamethylene diisocyanate and more preferably aromatic isocyanates such as m- and p-phenylene diisocyanate, tolylene-2,4- and 2,6-diisocyanates, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyl diphenyl, 3-methyldiphenylmethane-4,4'-diisocyanate and diphenyl ether diisocyanate, cycloaliphatic diisocyanates such as cyclohexane-2,4- and 2,3-diisocyanates, 1-methyl cyclohexyl-2,4- and 2,6-diisocyanates and mixtures thereof and bis-(isocyanatocyclohexyl-)methane and triisocyanates such as 2,4,6-triisocyanatotoluene and 2,4,4'-triisocyanatodiphenyl ether.

According to embodiments, the polyisocyanate composition comprises mixtures of isocyanates. For example a mixture of tolylene diisocyanate isomers such as the commercially available mixtures of 2,4- and 2,6-isomers and also the mixture of di- and higher poly-isocyanates produced by phosgenation of aniline/formaldehyde condensates. Such mixtures are well-known in the art and include the crude phosgenation products containing mixtures of methylene bridged polyphenyl polyisocyanates, including diisocyanate, triisocyanate and higher polyisocyanates together with any phosgenation by-products.

Preferred polyisocyanate compositions of the present invention are those wherein the polyisocyanate is an aromatic diisocyanate or polyisocyanate of higher functionality in particular crude mixtures of methylene bridged polyphenyl polyisocyanates containing diisocyanates, triisocyanate and higher functionality polyisocyanates. Methylene bridged polyphenyl polyisocyanates (e.g. Methylene diphenyl diisocyanate, abbreviated as MDI) are well known in the art and have the generic formula I wherein n is one or more and in the case of the crude mixtures represents an average of more than one. They are prepared by phosgenation of corresponding mixtures of polyamines obtained by condensation of aniline and formaldehyde.

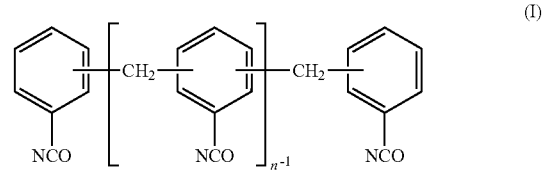

(I)

Other suitable polyisocyanate compositions may include isocyanate ended prepolymers made by reaction of an excess of a diisocyanate or higher functionality polyisocyanate with a hydroxyl ended polyester or hydroxyl ended polyether and products obtained by reacting an excess of diisocyanate or higher functionality polyisocyanate with a monomeric polyol or mixture of monomeric polyols such as ethylene glycol, trimethylol propane or butane-diol. One preferred class of isocyanate-ended prepolymers are the isocyanate ended prepolymers of the crude mixtures of methylene bridged polyphenyl polyisocyanates containing diisocyanates, triisocyanates and higher functionality polyisocyanates.

According to embodiments, the isocyanate reactive composition is selected from isocyanate reactive compounds having active-hydrogen atoms. These isocyanate reactive compounds can be selected from the group of aliphatic and aromatic monoamine/polyamine/aminosilane compounds, aromatic and aliphatic polyether and/or polyester monool/polyol compounds and mixtures thereof. Among the polyethers in particular suitable herein are the polyalkylene polyethers.

The monool and/or polyol compounds suitable in the present invention preferably have an average nominal hydroxy functionality of 1-8 and an average molecular weight of 32-8000 g/mol. Mixtures of monools and/or polyols may be used as well. Examples of such monools are methanol, ethanol, propanol, butanol, phenol, cyclohexanol, hydroxy acrylates (e.g. HEMA, hydroxy ethyl methacrylate) and hydrocarbon monools having an average molecular weight of 32-6000 g/mol like aliphatic and polyether monools. Examples of polyols are ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having more carbon atoms than these compounds and having a molecular weight of up to 8000 g/mol, polyester polyols having an average molecular weight of 200-8000 g/mol, polyether polyester polyols having an average molecular weight of 200-8000 g/mol and polyether polyols having an average molecular weight of 200-8000 g/mol. Such monools and polyols are commercially available. Useful examples are Daltocel® F555 and Daltocel® F442, which are all polyether triols from Huntsman, Voranol® P400 and Alcupol® R1610, which are polyether polyols from DOW and Repsol®, respectively, and Priplast® 1838 and 3196 which are high molecular weight polyester polyols from Croda, and Capa® 2043 polyol, a linear polyesterdiol of average MW of about 400 g/mol from Perstorp, and K-flex® polyols 188 and A308 which are polyester polyols from King Industries having a MW of about 500 and 430 g/mol respectively, and aromatic polyester polyols like Stepanpol® PH56 and BC180 having average molecular weights of about 2000 g/mol and 600 g/mol respectively, and Neodol® 23E which is an aliphatic monool from Shell. Most preferred are polyester and polyether polyols having an average molecular weight of 200-6000 g/mol and an average nominal functionality of 1-8.

According to embodiments, the catalysts used to promote a polyurethane and/or polyurea and/or polyisocyanurate formation (trimerization) in the gelling step f) are such that the polyisocyanate/catalyst weight ratio varies between 1 and 50000. The preferred polyisocyanate/catalyst weight ratio depends on formulation parameters such as for instance the amount/type of polyisocyanate used, the amount/type of isocyanate reactive compound, the reaction/cure temperature, the solvent used, additives used, the index, . . . .

Polyurethane catalysts for use in the present preparation methods include any of those catalysts known in the art to promote urethane and/or urea reaction. Suitable urethane catalysts include aliphatic and aromatic tertiary amines such as N,N-dimethylcyclohexyl amine, organometallic compounds, especially tin compounds such as stannous octoate and dibutyltin dilaurate, alkali metal salts.

Trimerisation catalysts for use in the present preparation method include any isocyanate trimerisation catalyst known in the art such as quaternary ammonium hydroxides and salts, alkali metal and alkaline earth metal hydroxides, alkoxides and carboxylates, for example potassium acetate and potassium 2-ethylhexoate, certain tertiary amines and non-basic metal carboxylates, for example lead octoate, and symmetrical triazine derivatives. Especially the triazine derivatives are preferred. Specific preferred trimerisation catalysts for use in the present method are Polycat® 41 available from Abbott Laboratories, and DABCO® TMR, TMR-2 and TMR-4 available from Air Products.

Mixtures of trimerisation catalysts and urethane catalysts can be used in any combination. The composition of the catalyst package will depend on the desired reaction profile.

According to embodiments, the polyisocyanate composition, the catalyst compound(s), the solvent and optionally the isocyanate reactive compositions and additives are mixed by simply shaking the reaction vessel or by slowly stirring the mixture the polyisocyanate composition, the catalyst compound(s), the solvent and optionally the isocyanate reactive compositions and additives, optionally in the form of a dispersion, are first mixed and subsequently the catalyst is added hereto. Mixing can be done at room temperature or at somewhat higher temperatures. Preferably, the mixture is left standing for a certain period of time to form a gel. This time period varies from 1 minute to several weeks depending on the system and the targeted pore size and density. The resulting gel can optionally be aged as well from a few hours to several weeks. Temperatures in the range of from about 10° C. to about 50° C., preferably 15 to 25° C. may be employed, a temperature of about at least 10° C. below the boiling point of the solvent used being preferred.

According to embodiments, the functionalization molecules (optionally dissolved in a solvent) are chosen such that they have a reactive group (A) which is capable of chemically reacting (covalent bond formation) with residual reactive groups (B) being present after gel formation on the pore surface of the porous (solvent filled) polyurethane, and/or polyurea and/or polyisocyanurate monoliths or particles. The presence of these residual reactive groups (B) is achieved by accurate control of the composition, type and weight ratios of the polyisocyanate composition, the optional isocyanate reactive composition, catalyst and optional additives used in the gelling step (step wherein a gel comprising a porous polyurethane and/or polyurea and/or polyisocyanurate network the pores are filled with solvent— is formed by combining the polyisocyanate composition, the optional isocyanate reactive composition, catalyst, solvent and optional additives).

According to embodiments, the functional group (C) in the functionalization molecules used to functionalize the isocyanate based organic aerogel/xerogel/cryogel according to the present invention may be selected from functional groups having hydrophobic properties. Examples of said functional groups are siloxanes, preferably polyalkylsiloxanes (such as PolyDiMethylSiloxanes (PDMS)), (long) aliphatic carbon chains having 8 or more carbon atoms (e.g. saturated/unsaturated fatty acid/alcohol derivatives), fluorinated/perfluorinated groups, Polyethylene, Polypropylene, Polybutadiene, and/or Polyisoprene, . . . .

According to embodiments, the functionalization molecules used to functionalize the isocyanate based organic aerogel/xerogel/cryogel according to the present invention may further have functional groups selected from functional groups having resistance or low reaction to fire. Examples of said functional groups are inorganic-based groups such as aluminium or magnesium-based functional groups (preferably oxides), aromatic groups such as polyimide, polybenzimidazole, . . . phosphorous or nitrogen-containing functional groups, halogenated groups such as brominated or chlorinated functional groups, . . . .

According to embodiments, the functionalization molecules used to functionalize the isocyanate based organic aerogel/xerogel/cryogel according to the present invention may further have functional groups selected from functional groups having selective adsorption (e.g. selective adsorption of cholesterol, sugars, metal cations, gases, . . . ). Examples of said functional groups are cyclodextrins, calixarenes, crown ethers and proteins.

According to embodiments, the functionalization molecules used to functionalize the isocyanate based organic aerogel/xerogel/cryogel according to the present invention may further have functional groups selected from functional groups having pH responsive properties. Examples of said functional groups are acids and bases (polysulfates, polyacrylic acid, Chitosan . . . ).

According to embodiments, the step of combining the polyisocyanate composition, catalyst compound(s), solvent, and optionally the isocyanate reactive composition and additives is such that a mainly polyisocyanurate (PIR) comprising gelling formulation is achieved having residual (reactive) NCO groups (B) on the pore surface of the porous monoliths or particles (solvent-filled pores) which are further reacted before solvent removal with the functionalization molecules having NCO reactive groups (A). Said NCO reactive groups may be selected from hydroxyl groups, amine groups, carboxylic groups, . . . . To achieve a mainly polyisocyanurate (PIR) comprising gelling formulation having residual (reactive) NCO groups (B), the catalyst used is selected from at least a trimerization catalyst and the ratio isocyanates/isocyanate reactives (NCO Index) is >>100, preferably >200, more preferably >300. FIG. 2A illustrates this approach wherein the MDI-based polymeric network has to be regarded as a mainly polyisocyanurate (PIR) comprising network.

According to embodiments, the step of combining the polyisocyanate composition, the isocyanate reactive composition, catalyst compound(s), solvent and optional additives is such that a mainly polyurethane (PUR) and/or polyurea comprising gelling formulation is achieved having residual (reactive) NCO groups (B) on the pore surface of the porous monoliths or particles (solvent-filled pores) which are further reacted before solvent removal with the functionalization molecules having NCO reactive groups (A). Said NCO reactive groups may be selected from hydroxyl groups, amine groups, carboxylic groups, . . . . To achieve a mainly polyurethane (PUR)/polyurea comprising gelling formulation having residual (reactive) NCO groups (B), the catalyst compound(s) used are selected from at least a polyurethane catalyst and the ratio isocyanates/isocyanate reactives (NCO Index) is at least 100, preferably in the range 100-200, more preferably 110-150. FIG. 2A also illustrates this approach wherein the MDI-based polymeric network has to be regarded as a mainly polyurethane (PUR)/polyurea comprising network.

According to embodiments, the step of combining the polyisocyanate composition, the isocyanate reactive composition, catalyst compound(s), solvent and optional additives is such that a mainly polyurethane (PUR) and/or polyurea comprising gelling formulation is achieved having residual isocyanate reactive groups (B) on the pore surface of the porous monoliths or particles (solvent-filled pores) which are further reacted before solvent removal with the functionalization molecules having groups (A) reactive towards groups (B). Groups (A) may be selected from NCO groups, epoxy groups, ester groups, acid groups, . . . . To achieve a mainly polyurethane (PUR)/polyurea comprising gelling formulation having residual isocyanate reactive groups (B), the catalyst compound(s) used are selected from at least a polyurethane catalyst and the ratio isocyanates/ isocyanate reactives (NCO Index) is below 100, preferably in the range 50-95. FIG. 2B illustrates this approach wherein the MDI-based polymeric network has to be regarded as a mainly polyurethane (PUR)/polyurea comprising network.

According to embodiments, the step of combining the polyisocyanate composition, the isocyanate reactive composition, catalyst, solvent and optional additives is such that a polyisocyanurate (PIR) and/or polyurethane (PUR) and/or polyurea comprising gelling formulation is achieved having residual silanes and/or acrylates (B) on the pore surface of the porous monoliths or particles (solvent-filled pores) which may be further reacted before solvent removal with functionalization molecules having reactive groups (A) selected from silanes, acrylates . . . .

According to embodiments, the step of adding at least one functionalization molecule may be done such that a partial functionalization of the porous polyurethane and/or polyurea and/or polyisocyanurate monoliths or particles is achieved by adjusting the amount of functionalization molecule added in the functionalization step. If complete functionalization is desired, a large excess of functionalization molecules preferably has to be added (unreacted functionalization molecules may be removed in a subsequent washing step).

The main advantage of adding the functionalization molecules after the step of forming a gel (gelation step, solvent-filled pores) comprising porous polyurethane and/or polyurea and/or polyisocyanurate monoliths or particles (and after optionally ageing the gel and/or removing unreacted species) and before drying the gel (solvent removal) comprising functionalized porous polyurethane and/or polyurea and/or polyisocyanurate monoliths or particles (versus during gelation or after solvent removal) is that it has no influence on gel formation (does not interfere with porous cross-linked network formation) and its flexibility/control over how functionalization takes place.

According to embodiments, the step of drying the gel comprising functionalized porous polyurethane and/or polyurea and/or polyisocyanurate monoliths or particles (solvent removal from the solvent-filled pores) for making a functionalized isocyanate based organic aerogel according to the invention is performed by using supercritical $CO_2$.

Supercritical drying of the gel to synthesize an aerogel involves placing the solvent-filled gel in a temperature-controlled pressure vessel and bringing the vessel to a pressure above the critical pressure of the solvent (for example by filling with nitrogen gas or pumping additional solvent). At that point the vessel is then heated above the critical temperature of the solvent. The pressure is then slowly released from the vessel while keeping a constant temperature. At atmospheric pressure and after a cool down period the aerogel is removed from the vessel.

Before the supercritical drying step the gel solvent may be exchanged with another solvent more suitable for supercritical drying, for example liquid carbon dioxide, possibly via an intermediate solvent such as acetone or via liquid carbon dioxide containing modifiers.

According to embodiments, the step of drying the gel comprising functionalized porous polyurethane and/or polyurea and/or polyisocyanurate monoliths or particles (solvent removal from the solvent-filled pores) for making a functionalized isocyanate based organic xerogel according to the invention is performed by evaporating the organic solvent being present in the gel under ambient conditions (e.g. by air-drying under ambient pressure until constant weight), drying under vacuum, drying in an oven at elevated temperatures, microwave drying, radiofrequency drying or any combination thereof. The drying step can take from 10 minutes to a few days but is generally less than 6 hours.

Before the solvent evaporation step in the xerogel synthesis the gel solvent may be exchanged with another solvent, for example a solvent with a higher vapor pressure (lower boiling point) and/or lower surface tension.

According to embodiments, the step of drying the gel comprising functionalized porous polyurethane and/or polyurea and/or polyisocyanurate monoliths or particles (solvent removal from the solvent-filled pores) for making a functionalized isocyanate based organic cryogel according to the invention is performed by removal of the organic solvent being present in the gel under freeze drying or sublimation conditions.

Before the solvent removal step in the cryogel synthesis the gel solvent may be exchanged with another solvent more suitable for freeze drying or sublimation conditions.

According to embodiments, the solvents to be used in the preparation method according to the present invention may be selected from hydrocarbons, aromatics, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers. Mixtures of such compounds can also be used.

Suitable hydrocarbon solvents include lower aliphatic or cyclic hydrocarbons such as ethane, propane, n-butane, isobutane, n-pentane, isopentane, cyclopentane, neopentane, hexane and cyclohexane.

Suitable dialkyl ethers to be used as solvent include compounds having from 2 to 6 carbon atoms. As examples of suitable ethers there may be mentioned dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether and ethyl t-butyl ether.

Suitable cyclic ethers include tetrahydrofuran.

Suitable dialkyl ketones to be used as solvent include acetone and methyl ethyl ketone.

Suitable alkyl alkanoates which may be used as solvent include methyl formate, methyl acetate, ethyl formate and ethyl acetate.

Suitable hydrofluorocarbons which may be used as solvent include lower hydrofluoroalkanes, for example difluoromethane, 1,2-difluoroethane, 1,1,1,4,4,4-hexafluorobutane, pentafluoroethane, 1,1,1,2-tetrafluoroethane, 1,1,2,2-tetrafluoroethane, pentafluorobutane, tetrafluoropropane and pentafluoropropane.

Suitable hydrochlorofluorocarbons which may be used as solvent include chlorodifluoromethane, 1,1-dichloro-2,2,2-trifluoroethane, 1,1-dichloro-1-fluoroethane, 1-chloro-1,1-difluoroethane, 1-chloro-2-fluoroethane and 1,1,1,2-tetrafluoro-2-chloroethane.

Suitable chlorofluorocarbons which may be used as solvent include trichlorofluoromethane, dichlorodifluoromethane, trichlorotrifluoroethane and tetrafluorodichloroethane.

Suitable hydrochlorocarbons which may be used as solvent include 1- and 2-chloropropane and dichloromethane.

Suitable halogenated aromatics include monochlorobenzene and dichlorobenzene.

Suitable aromatic solvents include toluene, benzene, xylenes . . . .

Suitable fluorine-containing ethers which may be used as solvent include bis-(trifluoromethyl) ether, trifluoromethyl difluoromethyl ether, methyl fluoromethyl ether, methyl trifluoromethyl ether, bis-(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether, 1,1,1,3,3,3-hexafluoroprop-2-yl fluoromethyl ether.

Another suitable solvent is N-methyl pyrolidone.

Preferred solvents for use in the method according to the present invention are dichloromethane, acetone, n-pentane, ethyl acetate, methyl ethyl ketone, tetrahydrofuran, monochlorobenzene, trichlorofluoromethane (CFC 11), chlorodifluoromethane (HCFC 22), 1,1,1-trifluoro-2-fluoroethane (HFC 134a), 1,1-dichloro-1-fluoroethane (HCFC 141b) and mixtures thereof such as HCFC 141b/CFC 11 mixtures.

Another suitable solvent is liquid carbon dioxide ($CO_2$). Liquid carbon dioxide may be used under various pressures (above 63 bar) and temperatures. Also sub- or supercritical carbon dioxide can be used as a solvent. The solvent power of sub- or supercritical carbon dioxide can be adjusted by adding suitable modifiers such as methanol, ethanol, acetone, HCFC 22, dichloromethane in levels of 0.1 to 50% by volume. In case liquid carbon dioxide is used as solvent it has been shown to be an advantage to use as polyisocyanate in the preparation of the present aerogels/xerogels/cryogels a fluorinated isocyanate-ended prepolymer made from a polyisocyanate and a fluorinated isocyanate-reactive compound such as a fluorinated monol or diol.

Other suitable solvents include C1-C8 hydrocarbons in sub- or supercritical state. The solvent power of these sub- or supercritical C1-C8 hydrocarbons can be adjusted by using suitable modifiers.

Further suitable additives to be used in the process of the present invention and further suitable processing methods are described in WO 95/03358, which is incorporated herein by reference.

According to a third aspect of the invention, various uses and applications of the functionalized xerogels/aerogels/cryogels of the present invention are disclosed. A few examples are described hereinafter.

The functionalized xerogels/aerogels/cryogels according to the invention can be blended in the polyisocyanate and/or polyol compositions for use in preparing polyurethane foams. Subsequent foaming leads to foams loaded with solid polyisocyanate-based aerogel/xerogel/cryogel particles which may enhance physical/mechanical properties, thermal insulation properties, acoustic insulation properties and fire performance of the resultant foams. This concept can also be used in the preparation of other types of foam such as thermoplastic foams made via an extrusion process.

The functionalized xerogels/aerogels/cryogels according to the invention can be glued together using binders or adhesives. A block of material is then obtained which consists mainly of xerogels/aerogels/cryogels. Said blocks can be made by putting the xerogels/aerogels/cryogels particles/powders in a mould and compressing them with or without temperature increase and optionally under inert atmosphere to make a compacted xerogel/aerogel/cryogel block.

The functionalized xerogels/aerogels/cryogels according to the invention can be combined with other materials (e.g. fillers) to create novel composite materials having improved thermal insulating properties (lower lambda values), improved acoustic insulation properties and/or improved fire retardancy compared to state of the art isocyanate based composites.

The functionalized xerogels/aerogels/cryogels according to the invention can be used for thermal insulation purposes, for example in vacuum panels.

The functionalized xerogels/aerogels/cryogels according to the invention can be used for thermal insulation and/or acoustic insulation. For example to make an acoustic and/or thermal insulation panel or a thermal and/or acoustic encapsulating insulation shield suitable for encapsulating complicated 3D shaped objects.

Furthermore, the invention discloses the use of the functionalized xerogels/aerogels/cryogels according to the invention to achieve selective absorption/adsorption (e.g. oil spillage uptake . . . ), to achieve waterproof properties (e.g. floating open cell/breathing material), to achieve superior fire properties, to achieve DNA recognition, to achieve selective filtration (selective filters), to achieve smart properties (e.g. pH-responsive . . . ), to achieve mechanical property improvement, to achieve superior catalysis, to realise hydrogen storage . . . and many more.

The independent and dependent claims set out particular and preferred features of the invention. Features from the dependent claims may be combined with features of the independent or other dependent claims as appropriate.

The above and other characteristics, features and advantages of the present invention will become apparent from the detailed description, taken in conjunction with the accompanying examples which illustrate the principles of the invention.

EXAMPLES

Compounds Used:
Suprasec® 2085 (from Huntsman): a polymeric MDI with NCO=30.5 and an average functionality of 2.9
Dabco® TMR (from Air Products) a tertiary amine catalyst that promotes the polyisocyanurate reaction (trimerization).
Acetone
Dichloromethane
(6-7% Aminopropylmethyl) dimethylsiloxane copolymer obtained from ABCR (AB109375)

Example 1

Functionalization of a PIR Xerogel with Hydrophobic Amino-Polysiloxanes Resulting in a Hydrophobic MDI-Based Xerogel A gel was prepared by mixing the following chemicals (at an isocyanate index of 2644) in a plastic vial in the following order:
1) 1.46 g of Polyisocyanurate (PIR) catalyst solution (3 w % Dabco® TMR in dichloromethane)
2) 3.68 g of acetone
3) 2.69 g of dichloromethane
4) 3.29 g of MDI solution (40 w % Suprasec® 2085 in dichloromethane)

The vial was then closed and shaken for 6 seconds before being let still to allow trimerization of MDI (PIR crosslinking reaction). A gel was formed after about 5 minutes and ageing was carried out for a total of 24 h. As expected for high index PIR formulations, unreacted NCO groups remained even after 24 h ageing as demonstrated by Infra-Red analysis (monitoring of the NCO absorbance peak at ~2270 cm$^{-1}$).

Functionalization (hydrophobization) of the wet gel (solvent-filled pores) was then performed by reacting the residual NCO groups with an Aminopropylmethyl dimethylsiloxane copolymer (i.e. aminopolydimethylsiloxane) according to the following procedure: 5 g of AB109375 were dissolved in 10 ml of dichloromethane, poured on the previously formed gel, and let to diffuse through the pores and react (in the absence of any extra added catalyst) for 48 h. Successful functionalization was monitored by InfraRed versus time (complete disappearance of the NCO absorbance peak at ~2270 cm$^{-1}$).

4 solvent exchanges with n-pentane were then performed over a period of 4 days (functionalized solvent-filled gel was placed in 3 times its volume of n-pentane, and this was repeated every 24 h) to ensure all unreacted functionalization molecules (AB109375) were removed. The vial was finally opened and the solvent was let to evaporate under ambient pressure, at room temperature and until constant xerogel weight in order to produce the functionalized (hydrophobic) MDI-based xerogel monolith. Xerogel density was measured around 300 kg/m$^3$.

Xerogel hydrophobicity was tested by placing a drop of water on top of the surface of a small piece (xerogel particle) taken from the center of the xerogel monolith. No infiltration took place (no absorption) with the water drop sitting on top of the surface with a very large contact angle. The hydrophobic xerogel was also floating (water infiltration test) on top of a water surface (see FIG. 3A), confirming its water repellency (non-infiltrated pores). A drop of conventional silicon oil, however, when placed in contact with the hydrophobic xerogel got absorbed within seconds. This is clearly a hydrophobic MDI-based PIR xerogel.

Comparative Example 1

Fabrication of a PIR Xerogel Without Functionalization Resulting in a Non-Hydrophobic Xerogel The gel was prepared similarly as for Example 1, except that no functionalization was performed. Xerogel density was measured around 200 kg/m$^3$.

Hydrophobicity was similarly tested by placing a drop of water on top of the surface of a small piece (xerogel particle) taken from the center of the xerogel monolith. Infiltration (absorption) took place within seconds. A similar result (absorption) was obtained with conventional silicon oil. Contrary to Example 1, this non-functionalized PIR xerogel sinks into water as shown in FIG. 3B (water infiltration test). This is clearly not a hydrophobic MDI-based PIR xerogel.

The invention claimed is:
1. A process for making a functionalized isocyanate based organic aerogel/xerogel/cryogel, said process comprising the following steps:
 a) providing a polyisocyanate composition, and
 b) optionally providing an isocyanate reactive composition, and
 c) optionally providing at least one catalyst compound promoting a polyurethane, polyurea, or polyisocyanurate formation, and
 d) providing a solvent, and
 e) optionally providing further additives, and then
 f) combining the compositions/compounds a), d) and optionally b) and/or c) and/or e) to form a gel comprising a porous cross-linked polyurethane, polyurea, or polyisocyanurate network having residual reactive groups (B), and then
 g) optionally removing unreacted species, and then
 h) adding at least one functionalization molecule having a solubility in water <10 g/L at 20° C., wherein said functionalization molecule comprises at least one reactive group (A) being capable of binding to the residual reactive groups (B) and at least one functional group

(C) which provides the porous network with the desired functionalization and forming a functionalized porous network, and then,
i) optionally removing unreacted species, and then
j) optionally exchanging solvent, and then
k) drying solvent removal the functionalized porous network in order to obtain the functionalized isocyanate based organic aerogel/xerogel/cryogel; and wherein the residual reactive groups (B) comprises silane groups or acrylate groups, and the at least one reactive group (A) comprises silane groups or acrylate groups.

2. The process according to claim 1, further comprising after the gelling step, a step wherein the obtained gel is a monolithic gel which is optionally broken or grinded into particles having smaller dimensions.

3. The process according to claim 1, further comprising after the gelling step, a step wherein the obtained gel or particles are aged.

4. The process according to claim 1, wherein the polyisocyanate composition comprises aliphatic isocyanates, aromatic isocyanates, or combinations thereof.

5. The process according to claim 1, wherein the isocyanate reactive composition is selected from the group of aliphatic and aromatic monoamine/polyamine compounds, aromatic and aliphatic polyether and/or polyester monool/polyol compounds, or combinations thereof.

6. The process according to claim 1, wherein the step of combining the compositions/compounds a), d) and optionally b) and/or c) and/or e) is performed by mixing or simply shaking the reaction vessel or by slowly stirring the mixture at temperatures in the range of from about 10° C. to about 50° C., and then the mixture is left standing for a certain period of time to form a gel.

7. The process according to claim 1, wherein the step of removing the solvent in step k) is performed by drying the gel comprising the functionalized porous network by using supercritical $CO_2$, alternatively the step of drying is performed by evaporating the organic solvents being present in the gel by air-drying under ambient pressure and ambient temperature until constant weight, drying under vacuum, drying in an oven at elevated temperatures, microwave drying, radiofrequency drying, sublimation, freeze drying or any combination thereof.

8. The process according to claim 1, wherein the solvents comprises hydrocarbons, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers, or combinations thereof.

* * * * *